April 2, 1968      A. J. HANLON      3,375,767
CAMERA BELLOWS AND METHOD OF CONSTRUCTION
Filed Jan. 7, 1966      2 Sheets-Sheet 1
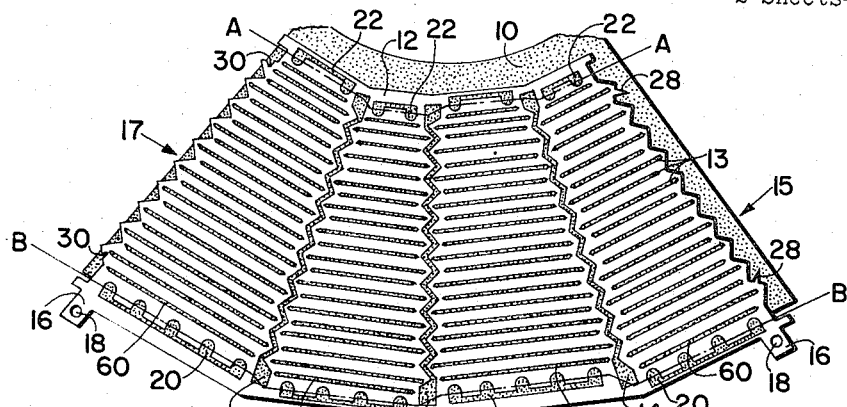
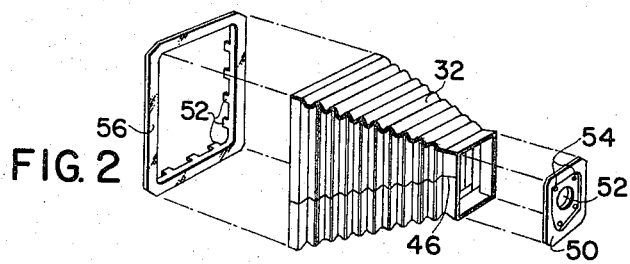
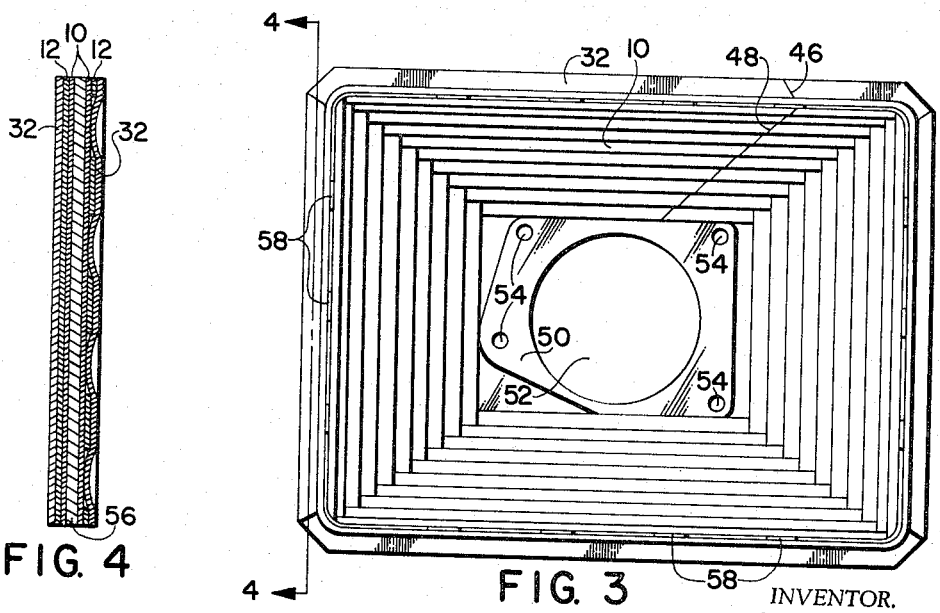
INVENTOR.
Albert J. Hanlon
BY Brown and Mikulka
and
Charles S. McGuire
ATTORNEYS April 2, 1968     A. J. HANLON     3,375,767

CAMERA BELLOWS AND METHOD OF CONSTRUCTION

Filed Jan. 7, 1966     2 Sheets-Sheet

INVENTOR.
Albert J. Hanlon
BY Brown and Mikulka
and Charles S. McGuire
ATTORNEYS

United States Patent Office 3,375,767
Patented Apr. 2, 1968

3,375,767
CAMERA BELLOWS AND METHOD
OF CONSTRUCTION
Albert J. Hanlon, Somerville, Mass., assignor to
Polaroid Corporation, Cambridge, Mass., a
corporation of Delaware
Filed Jan. 7, 1966, Ser. No. 519,214
6 Claims. (Cl. 95—39)

This invention relates to the construction of expansible and collapsible bellows of the type commonly used in photographic apparatus such as cameras, enlargers, and the like.

In many types of photographic apparatus it is necessary to provide a protected light path between a photosensitive material and optical elements which are used to focus an image to be recorded on said photosensitive material at the plane thereof. It is desirable to construct the light path means in a way which allows relative movement between the optical elements and the photosensitive material, such movement being effected for focusing purposes as well as for moving the apparatus to a folded or collapsed position when not in use. In the usual folding-type camera, for example, the device is much more compact, and therefore more easily stored or transported, when in the folded position. The most commonly used light path means for photographic apparatus wherein a substantial amount of relative movement between the lens and film plane is desired, is a four-sided bellows construction having fold lines arranged along the walls in a direction perpendicular to the major axis of the bellows. Bellows of good quality are commonly constructed of a flexible, opaque material such as a suitable black fabric with a stiffening material secured thereto in the areas between the fold lines. The stiffening material may be formed according to a predetermined pattern from any suitable material such as heavy paper, for example, and secured to the opaque material by cementing. A covering of flexible material such as leather, vinyl, or the like is then secured to the structure so that the stiffening material is between the opaque inner liner and the cover material. The bellows is then folded and joined to itself along a seam to provide the four-sided construction, and the pleats or fold lines are made at the appropriate places. Rigid members such as metal frames or plates are commonly inserted at the front and rear ends of the bellows to provide the necessary rigidity and also serve as a means for attaching the bellows to other elements of the apparatus wherein it is employed. The bellows material is folded over and attached to the front and back plates or frames in light-tight engagement.

A principal requirement for a bellows to be used in a folding camera, or other apparatus wherein photosensitive materials are utilized, is complete opacity and a construction which insures that no light leaks will develop in any part of the bellows or between the bellows and other elements to which it is attached. This is especially critical when the bellows is employed with photographic apparatus which utilizes extremely sensitive photographic materials. Although generally satisfactory bellows constructions have been widely known and used for many years, the requirement for opacity and complete light-tightness has become much more stringent with the more recent wide use of photographic negatives having ASA ratings of 3,000 and higher. The present invention is concerned with improving present techniques or constructing bellows of the general type presently in wide use on folding cameras.

It is a principal object of the present invention to provide novel and improved features in the construction of camera bellows which combine to insure total light-tightness of the finished product.

Another object is to provide a camera bellows formed from a laminated structure having several layers of materials wherein means are provided to prevent separation of the layers in certain areas, thereby preventing light leaks in such areas.

It is a further object to provide a bellows construction which may be more easily assembled to the precise dimensional tolerances required to insure complete light-tightness.

Still another object is to provide an improved method for the construction of high quality camera bellows, whereby such bellows may be mass produced to close tolerances and incorporated with other photographic apparatus such as folding cameras with a high degree of assurance that no light leaks will be present or will later develop.

Other objects of the invention will in part be obvious and will in part appear hereinafter.

The invention accordingly comprises the process involving the several steps and the relation and order of one or more of such steps with respect to each of the others, and the article of manufacture possessing the features, properties, and relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a plan view of portions of the bellows of the invention in an intermediate stage of manufacture;

FIG. 2 is an exploded perspective view of the bellows, including the front and rear frames which are incorporated therewith;

FIG. 3 is a rear elevational view of the finished bellows;

FIG. 4 is a side sectional view on the line 4—4 of FIG. 3;

Figure 5:
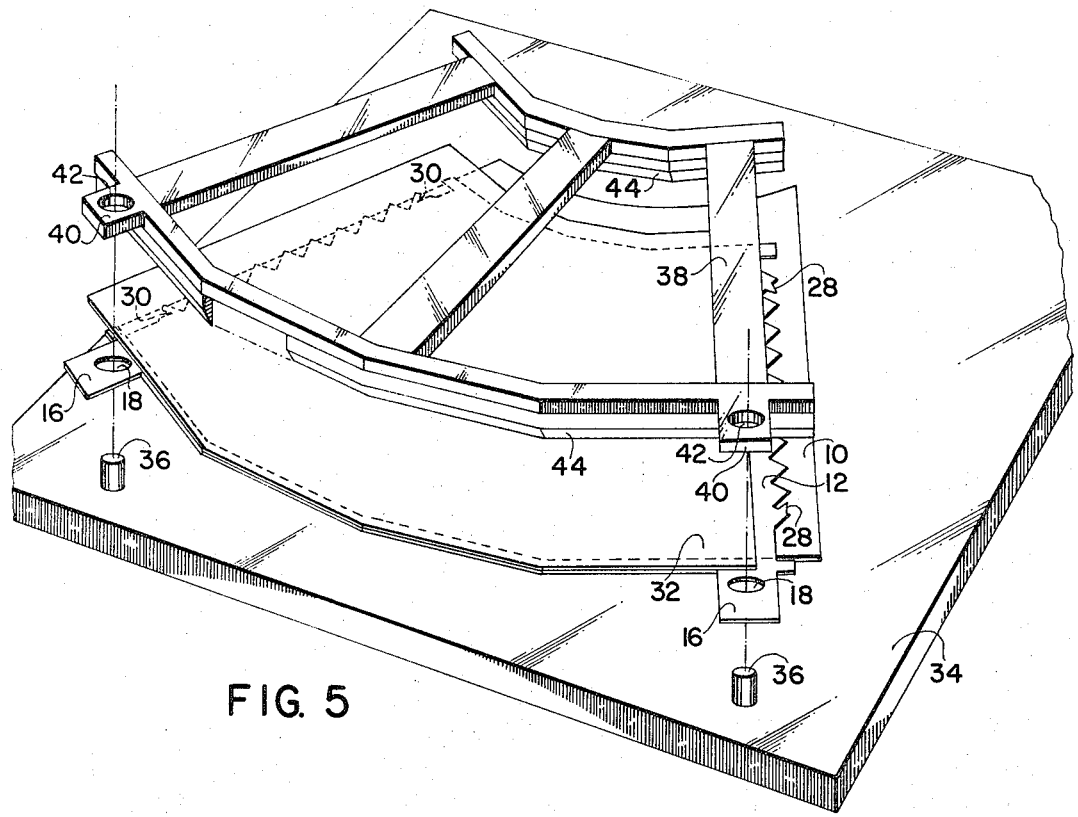
FIG. 5 is a perspective view illustrating a step in the manufacture of the bellows.

The bellows of the present invention is formed, according to the usual, conventional practice, by initially supplying the materials which are associated to form the bellows walls in the form of flat sheets. Two such sheets are shown in FIGURE 1 after having been cut according to a predetermined pattern and superposed with one another. The lower sheet shown in FIGURE 1 and designated by the reference numeral 10 ultimately forms the inner lining of the bellows and is made of a flexible, opaque material such as a suitable black fabric. Sheet 12, hereinafter referred to as the stiffener, or stiffening skeleton, is prepared separately from sheet 10 from a material such as stiff paper or thin card stock by means of a steel rule die or other suitable cutting instrument. The sheet from which stiffener 12 is constructed is cut by the die to form the external peripheral configuration and internal cut-out areas illustrated in FIGURE 1. This configuration is designed to prepare the stiffener, while in the form of a flat sheet, for incorporation with the flexible sheet elements to provide stiffening thereof in the areas between the fold lines. These lines appear in registration with the parallel cut-out areas 13 as well as the three zigzag cut-out areas 14 which run along the corner folds after the bellows is formed in the four-sided configuration of FIG. 2. The fourth corner fold is provided by bringing longitudinal edges 15 and 17 into proximity and forming a seam in this area. Other constructional features of stiffener 12 which are important to the present invention include corner ears 16 having holes 18 formed therein, cut-out areas 20 along each side of stiffener 12 at what will be the rear end of the bellows, cut-out areas 22 along each side of stiffener 12 at what will be the front end of the bellows, tabs 28 extending from one of the longitudinal zigzag edges of the stiffener and notches 30 formed in the other longitudinal edge.

After stiffener 12 has been positioned on and secured to sheet 10, a cover sheet of a flexible material which will provide the desired external appearance for the bellows is positioned over the stiffener and secured thereto. Although the cover material is not shown in FIGURE 1 so that the construction of stiffener 12 may be seen more clearly, the external cover is shown in the finished bellows of FIG. 2 and designated by the reference numeral 32. The most effective and convenient means for securing cover 32 to the other layers of material to form the laminated structure of the finished bellows is by applying a layer of pressure and/or heat sensitive adhesive to the surface of cover 32 which is applied to stiffener 12. Thus, liner material 10 and cover material 32 will be adhered to stiffener 12 on opposite sides thereof, thereby enclosing the stiffener between the other two sheets of material to form a laminated sheet structure having three layers. It is also preferred that the opposing surfaces of materials 10 and 32 will be adhered to one another in the areas where cutouts are provided in stiffener 12. In fact, one of the principal advantages of the bellows construction of the present invention is provided by securing cover 32 to liner 10 through cut-out areas 20 and 22 in stiffener 12.

After the three sheets or layers are prepared as described above, they are trimmed along the front and rear edges by a suitable die. This is most economically accomplished by stacking a number of the laminated sheet structures for trimming the excess material from all of such stacked sheets in a single cutting operation. In order to achieve the precise dimensional tolerances required, it is essential that all sheets be stacked in exact registration with one another, and that the resulting stack be properly registered with respect to the die. Previously mentioned tabs 16 are provided for the purpose of achieving precise registration in a simple and efficient manner. In FIG. 5 is shown a portion of a support 34 upon which the assemblies are placed for the trimming operation. Pins 36 are affixed to support 34 and extend therefrom in position for insertion through holes 18 of ears 16. Movable die 38 includes projections 40 having holes 42 formed therein for positioning over pins 36. An appropriate knife edge, a portion of which is shown at 44, extends from movable die 38 toward support 34. Suitable, conventional means (not shown) are provided for moving die 38 to cause knife edge 44 to cut through the laminated sheets which are stacked on the support. Pins 36 passing through holes 18 in each of the sheet structures and holes 42 in the die insure proper registration of the sheets with respect to one another and to the die.

The sheets are trimmed at the front and rear edges along the dot-dash lines indicated in FIGURE 1 as A—A and B—B, respectively. As a result, portions of the sheets including parts of cut-out areas 20 and 22 will be trimmed away from the remaining portions of the sheets which are to form the finished bellows. Since the sheets have been secured in the previously described three-layer structure prior to the trimming operation, portions of liner 10 and cover 32 will remain secured to one another in the areas of cutouts 20 and 22 which remain with the main bellows portion.

After the trimming operation the sheets are removed from support 34 and folded into the four-sided configuration with the two longitudinal, zigzag edges of stiffener 12 adjacent one another along one corner, and a corner fold along each of zigzag cut-out areas 14. A sufficient amount of materials 10 and 32 is allowed to overlap stiffener 12 so that these materials may be sealed to themselves after the bellows is folded into the four-sided configuration. Thus, there will be an external seam, indicated in FIG. 2 by the reference numeral 46, and an internal seam indicated in FIG. 3 by the reference numeral 48. According to conventional practice, the amount of overlapping material of sheet 10 and 32 is such that seams 46 and 48 are not in alignment, thus reducing the possibility of light leak along the seams.

Figure 6:
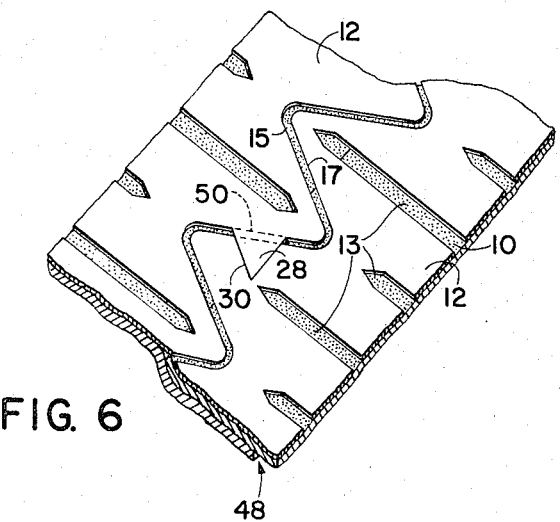
FIG. 6 is an enlarged, fragmentary, perspective view of a portion of the bellows showing the construction in the area of the seam where the bellows is joined to itself.

In FIG. 6 is shown an enlarged fragment of liner 10 in the areas of seam 48, and stiffener 12 in the area where the two zigzag edges are brought together. It is essential, of course, that these two zigzag edges be properly spaced from one another, and axially aligned, when the liner and cover materials are sealed to themselves in forming the interior and exterior seams so that the peripheral dimensions of the bellows at the front and rear ends will be the exact size required. In folding the bellows material into the four-sided configuration as a manual operation, it has heretofore been the practice to leave the spacing of the zigzag edges to the experience and skill of the individual operator performing the operation with no additional means provided to assist in achieving the proper spacing and alignment. According to the present invention, as shown in FIG. 6, tabs 28 are so dimensioned and positioned that the desired spacing between edges 15 and 17 is provided by the mating of tabs 28 with notches 30. The overlapping portions of sheets 10 and 32 may then be sealed to form seams 46 and 48 with assurance that the peripheral dimensions of the bellows at the front and rear ends corresponds exactly to the dimensions desired. Although tabs 28 extend across one of the corner folds where the stiffener material is normally cut out, this represents a very small fraction of the total length of the corner fold at which the seams are made. If desired, tabs 28 may be scored along dotted lines indicated in FIG. 6 by the reference numeral 50 to provide easier bending on the stiffener material which forms the tabs across the corner fold.

Referring again to FIG. 2, the front and rear frames which are incorporated with the folding portion of the bellows are shown in position for insertion into the front and rear openings of the four-sided bellows construction. The frames impart the necessary rigidity to the bellows in the areas where it is attached to other elements of the camera. Accordingly, the frames are normally constructed of metal or some other suitable rigid material. Front frame 50 includes central aperture 52 which is aligned with the optical axis of the camera with which the bellows is associated to allow passage of light through the bellows upon actuation of the camera shutter. Smaller openings 54 are provided in front plate 50 for the insertion of screws or rivets which secure the bellows to the lens board or shutter housing of the camera. Rear frame 56 includes tabs 58 which extend rearwardly from the bellows after incorporation of frame 56, and serve as means for securing the rear end of the bellows to the camera body around the opening wherein the photosensitive material is positioned for exposure. That is, tabs 58 are positioned to extend through this opening, or to cooperate with other suitable portions of the camera body, and are bent over after being so positioned to secure the bellows in light-tight engagement with the camera body. It is the normal practice to provide suitable gaskets (not shown) between the front and rear of the bellows and the portions of the camera with which they are engaged in order to insure a light-tight engagement.

After front and rear plates 50 and 56 have been inserted in the open ends of the four-sided bellows, marginal edge portions of the material are folded over the bounding edges of each of the frames and cemented to the opposing surfaces thereof on both sides. The bellows are so dimensioned that the endmost transverse cutout in stiffener 12 adjacent the rear end of the bellows, i.e., those cutouts indicated by the reference numeral 60 in FIGURE 1, are in registration with the four edges of frames 56. It has previously been the practice to leave the material which is secured to the outside of the frame in the same three-layer construction as between the other transverse folds in the bellows. Since the bellows material is folded sharply essentially 180° around the edges of frame 56, there is a certain amount of shearing force tending to separate the layers of material even though the stiffener is cut away in the area where the fold is sharpest. Any separation of stiffener 12 from liner 10, or of cover 32 from stiffener 12, in the marginal edge portions which are folded over frame 56 will tend to produce light leaks after the bellows is joined to the camera. Therefore, any bellows wherein such separations occur is defective and unacceptable for incorporation with a camera designed to utilize high speed film.

The aforementioned separations tend to occur at the free edge of the material which is folded over frame 56. The portions of cut-out areas 20 which remain on the main body of the bellows after the edges have been trimmed lie along the free edge which is folded over frame 56. As shown in the sectional view of FIG. 4, cover 32 extends through cut-out areas 20 in stiffener 12 to be attached directly to liner 10 in such areas. The relative thickness of the various materials and frame are, of course, exaggerated in FIG. 4 to provide a clear illustration of all of the various layers. The adhesive bond which is achieved by securing the cover directly to the liner, while still providing portions of the stiffener between the two, insures a much more effective bond along the edge of the bellows material which is folded over and secured to frame 56.

It will be noted from an examination of FIGURE 1 that a continuous strip of stiffener material is left between transverse cutouts 60 and areas 20. Since transverse cutouts 60 are arranged to lie in registration with the four edges of frame 56 around which the bellows material is folded, a continuous strip of stiffener material is arranged around the edges of the frame (with the exception of the corners) on the side thereof which is joined to the camera body. Cut-out areas 20 are all arranged to lie inwardly from this continuous strip of stiffener material, whereby the bellows material is of uniform thickness around the edges of the frame. If cut-out areas 20 extend to the edge of the frame, nonuniform thickness results, thereby giving rise to other possible sources of light leaks after the bellows has been joined to the camera. The foregoing explanation of the function and positional relationship of cut-out areas 20 to the other layers of bellows material and rear frame 56, apply in like manner to cut-out areas 22 and front frame 50. That is, the resulting bond achieved by the provision of cut-out areas 22 in the indicated positions insure against undesirable separations of the various layers of bellows material and enhance light-tightness in the areas where the front of the bellows is joined to the lens board or shutter housing. It will also be noted from the illustrated configurations of areas 20 and 22 that although a plurality of such areas lie along each side of the bellows at both ends after the trimming operation, the stiffening skeleton is cut so that the portions removed to form these areas are in one piece along each side.

The bellows construction of the present invention greatly improves the light-tightness of the finished product when associated in the usual manner with a photographic camera. Although the materials from which the bellows is constructed are opaque and formed into a four-sided configuration with a light-tight seam along one side, it is of the utmost importance that precise dimensional tolerances be maintained so that no light leaks will be present or will later develop at the front and rear ends where the bellows is joined to other elements of the camera. The invention provides means for trimming edge portions from the bellows material while maintaining precise registration of the material and the trimming die, for insuring exact peripheral dimensions and axial registration when the side seam is made, and for preventing separation of the layers of bellows material in the areas where such material is folded over and secured to supporting frames at the front and rear ends. All of these features combine to provide a bellows construction of superior light sealing qualities.

Since certain changes may be made in the above process and article without departing from the scope of the invention herein involved, it is intended that all matter contained in the above description or shown in the accompanying drawings shall be interpreted as illustrative and not in a limiting sense.

What is claimed is:

1. An expansible and collapsible bellows adapted to form a light-tight path between the lens and film plane of a photographic camera, said bellows comprising, in combination:
    (a) a hollow, four-sided body portion having a substantially rectangular cross section and open front and rear ends;
    (b) a plurality of fold lines extending in parallel relation transversely along each of said sides and cooperatively arranged to allow axial relative movement of said front and rear ends;
    (c) a pair of rigid frames having bounding edges extending, respectively, around the peripheries of said front and rear ends;
    (d) said body portion being formed of a laminated sheet material having at least three layers;
    (e) marginal edge portions of said sheet material being folded over said bounding edges and secured to a surface of each of said frames around said peripheries; and
    (f) means securely bonding the opposing surfaces of the two outer layers of said sheet material through cut-out areas in the intermediate layers in said marginal edge portions.

2. The invention according to claim 1 wherein said cut-out areas are provided in said marginal edge portions along each of said four sides.

3. The invention according to claim 2 wherein a plurality of said cut-out areas are arranged in spaced relation along each of said four sides inwardly of said bounding edge portions, whereby the portion of said marginal edge portions immediately adjacent said bounding edges includes said intermediate layers.

4. The invention according to claim 1 wherein said sheet material is initially in flat form and is folded to bring the two longitudinal edges into proximity, thereby providing said hollow construction, at least one of said layers being overlapped and bonded to itself to form a light-tight seam and at least one other of said layers having a tab extending from one of said longitudinal edges and a notch in the other of said edges, said tab and notch being so constructed and arranged that proper peripheral dimensioning and axial registration of said bellows is provided by mating said tab in said notch when said longitudinal edges are brought into proximity.

5. The invention according to claim 4 wherein said two outer layers are overlapped and bonded to themselves and said intermediate layer includes said tab and notch.

6. The method of fabricating an expansible and collapsible camera bellows comprising:
    (a) forming a stiffening skeleton by cutting out predetermined areas of a flat sheet of a suitable stiffener material;
    (b) placing said stiffening skeleton on a first flat sheet of flexible material and bonding the opposing surfaces together;
    (c) placing a second flat sheet of flexible material on the exposed surface of said stiffening skeleton and bonding the opposing surfaces of said second sheet and stiffening skeleton, and the opposing surfaces of said first and second sheets through said predetermined cutout areas, thereby forming a laminated sheet structure having three layers with front and rear edges and two longitudinal side edges;

(d) said stiffening skeleton being formed with a tab extending from one and a notch in the other of the longitudinal edges thereof and a pair of ears with holes therein extending from at least one of said front and rear edges beyond the corresponding edges of said first and second sheets;

(e) placing said sheet structure on a flat support having pins affixed thereto to extend through said holes, thereby positioning said sheet structure relative to said support;

(f) positioning a movable cutting die relative to said sheet structure by means of said pins and cooperable portions of said die;

(g) trimming portions of both of said front and rear edges from said sheet structure by movement of said cutting die, the portions trimmed away including said ears, thereby leaving said sheet structure with new front and rear edges;

(h) mating said tab into said notch by bringing said two longitudinal edges of said stiffening skeleton into proximity;

(i) folding said bellows along lines in registration with cut-out areas in said stiffening skeleton to provide a hollow, four-sided configuration with open front and rear ends, having a plurality of said fold lines extending in parallel relation transversely along each of said sides and cooperatively arranged to allow axial relative movement between expanded and collapsed positions;

(j) inserting rigid frames having substantially rectangular bounding edges into each of said open front and rear ends;

(k) folding marginal edge portions of said sheet structure adjacent said new front and rear edges over said bounding edges; and (l) bonding the opposing surfaces of said marginal edge portions and said frames to one another around the entire peripheries of said frames;

(m) said marginal edge portions including portions of said cut-out areas in said stiffening skeleton, whereby the opposing surfaces of said first and second sheets are bonded to one another through said cut-out areas in said marginal edge portions.

References Cited

UNITED STATES PATENTS 3,191,513   6/1965   Turner _____ 95—39

JOHN M. HORAN, *Primary Examiner.*

NORTON ANSHER, *Examiner.*